(12) United States Patent
Oteri et al.

(10) Patent No.: US 12,250,668 B2
(45) Date of Patent: Mar. 11, 2025

(54) SYSTEM AND METHOD FOR FAST BEAM TRACKING IN A HIGH FREQUENCY WIRELESS COMMUNICATION SYSTEM

(71) Applicant: Apple Inc., Cupertino, CA (US)

(72) Inventors: Oghenekome Oteri, San Diego, CA (US); Wei Zeng, Saratoga, CA (US); Yushu Zhang, Beijing (CN); Weidong Yang, San Diego, CA (US); Dawei Zhang, Saratoga, CA (US); Chunxuan Ye, San Diego, CA (US); Hong He, San Jose, CA (US); Haitong Sun, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/442,519

(22) PCT Filed: Oct. 16, 2020

(86) PCT No.: PCT/CN2020/121589
§ 371 (c)(1),
(2) Date: Sep. 23, 2021

(87) PCT Pub. No.: WO2022/077464
PCT Pub. Date: Apr. 21, 2022

(65) Prior Publication Data
US 2023/0239852 A1 Jul. 27, 2023

(51) Int. Cl.
*H04W 72/232* (2023.01)
*H04W 72/044* (2023.01)
(Continued)

(52) U.S. Cl.
CPC ......... *H04W 72/046* (2013.01); *H04W 72/23* (2023.01); *H04W 72/51* (2023.01); *H04W 72/54* (2023.01)

(58) Field of Classification Search
CPC ..... H04W 16/28; H04W 72/54; H04W 72/53; H04W 72/232; H04W 72/04; H04W 72/231
See application file for complete search history.

(56) References Cited

U.S. PATENT DOCUMENTS 10,651,917 B2  5/2020  John Wilson et al.
11,902,990 B2  2/2024  Li
(Continued)

FOREIGN PATENT DOCUMENTS

CN   109792745 A   5/2019
CN   110392438 A   10/2019
(Continued)

OTHER PUBLICATIONS

Samsung, "On Beam Indication," 3GPP TSG RAN WG1 Meeting 90bis, Prague, CZ, Oct. 9-13, 2017, R1-1717627; 9 pages.
(Continued)

*Primary Examiner* — Tu X Nguyen
(74) *Attorney, Agent, or Firm* — Sterne, Kessler, Goldstein & Fox P.L.L.C.

(57) ABSTRACT

Methods and apparatuses are disclosed for performing fast beam switching in a high-frequency wireless communication environment. Higher frequencies reduce transmission wavelength, which allows for an increased number of antennas and an increased number of beams. Therefore, beams become narrower and are more prone to failure. The UE must be capable of quickly identifying the beam failure and switching to a new beam. Therefore, the UE is capable of receiving multiple beams from the base station and configures both for testing and immediate use. In some cases, the UE can receive multiple beams for testing and assumes a default beam while feeding back to the base station a preferred beam. To support the larger number of available beams, MAC-CE and DCI are modified to identify this (Continued)

increased number of states. Alternatively, two MAC-CEs are sent, each containing a different group of states, and the DCI identifies both the group and the selected state.

13 Claims, 9 Drawing Sheets

(51) Int. Cl.
*H04W 72/23* (2023.01)
*H04W 72/51* (2023.01)
*H04W 72/54* (2023.01)

(56) References Cited

U.S. PATENT DOCUMENTS

| | | | |
|---|---|---|---|
| 2019/0239212 A1 | 8/2019 | Wang et al. | |
| 2019/0373450 A1* | 12/2019 | Zhou | H04W 76/11 |
| 2020/0007678 A1 | 1/2020 | Zhou et al. | |
| 2020/0145983 A1 | 5/2020 | Levitsky et al. | |
| 2020/0229161 A1* | 7/2020 | Raghavan | H04W 24/10 |
| 2020/0245333 A1 | 7/2020 | Lin et al. | |
| 2021/0050936 A1 | 2/2021 | Seo et al. | |
| 2021/0052654 A1 | 2/2021 | Schuster et al. | |
| 2021/0067979 A1* | 3/2021 | Rahman | H04L 5/0023 |
| 2021/0083914 A1 | 3/2021 | Cao | |
| 2023/0081293 A1 | 3/2023 | Li | |

FOREIGN PATENT DOCUMENTS

| | | |
|---|---|---|
| CN | 110474751 A | 11/2019 |
| CN | 110832919 A | 2/2020 |
| CN | 111344994 A | 6/2020 |
| CN | 111656839 A | 9/2020 |
| EP | 3961960 A2 | 3/2022 |
| WO | WO 2019215389 A2 | 11/2019 |
| WO | WO 2021027185 A1 | 2/2021 |
| WO | WO 2021175237 A1 | 9/2021 |

OTHER PUBLICATIONS

International Search Report and Written Opinion of the International Searching Authority directed to related International Patent Application No. PCT/CN2020/121589, mailed Jul. 21, 2021; 8 pages.

3GPP, "Remaining issues on beam measurement and reporting," R1-1801520, Mar. 2, 2018, accessed at https://www.3gpp.org/ftp/tsg_ran/WG1_RL1/TSGR1_92/Docs.

Office Action and Search Report directed to related Chinese Application No. 202080106249.4, with English-language translation of the Search Report attached, mailed May 14, 2024; 11 pages.

ZTE, "Enhancements on multi-beam operation," R1-1908192, Aug. 17, 2019; 26 pages.

* cited by examiner

SYSTEM AND METHOD FOR FAST BEAM TRACKING IN A HIGH FREQUENCY WIRELESS COMMUNICATION SYSTEM

This application is a U.S. National Phase of International Application No. PCT/CN2020/121589, filed Oct. 16, 2020, which is hereby incorporated by reference in its entirety.

FIELD

Various aspects generally relate to the field of wireless communications.

SUMMARY

Methods and apparatuses are disclosed for performing fast beam switching in a high-frequency wireless communication environment. Higher frequencies reduce transmission wavelength, which allows for an increased number of antennas and an increased number of beams. Therefore, beams become narrower and are more prone to failure. The UE must be capable of quickly identifying the beam failure and switching to a new beam. Therefore, the UE is capable of receiving multiple beams from the base station and configures both for testing and immediate use. In some cases, the UE can receive multiple beams for testing and assumes a default beam while feeding back to the base station a preferred beam. To support the larger number of available beams, MAC-CE and DCI are modified to identify this increased number of states. Alternatively, two MAC-CEs are sent, each containing a different group of states, and the DCI identifies both the group and the selected state.

In an embodiment, a user equipment (UE) is disclosed. The UE comprises a transceiver configured to transmit and receive wireless signals in communication with a base station and one or more processors. The one or more processors are configured to receive, from the base station, a configuration signal that includes a plurality of activated TCI states for a Control Resource Set (CORESET); decode, using a quasi-colocation provided by each of the plurality of activated TCI states, a physical downlink control channel (PDCCH); and configure a plurality of beams based on the decoded PDCCH, each of the plurality of beams corresponding to each of the plurality of activated TCI states.

In an embodiment, the one or more processors are further configured to combine the plurality of beams into an aggregate beam.

In an embodiment, the one or more processors are further configured to measure conditions of the channel; and dynamically select one of the plurality of beams based on the measured channel conditions.

In an embodiment, the one or more processors are further configured to generate a capability message signal, the capability message signal indicating that the UE is capable of processing more than one TCI state for a particular CORESET; and cause the transceiver the transmit the capability message signal to the base station.

In an embodiment, the configuration signal indicates a number of TCI states included in the plurality of TCI states.

In an embodiment, the configuration signal includes an interval that dictates when the base station will communicate using a first TCI state from among the plurality of TCI states, and when the base station will communicate using a second TCI state from among the plurality of TCI states, and the one or more processors are further configured to switch between the first TCI state and the second TCI state according to the interval.

In an embodiment, a user equipment (UE) is disclosed that includes a transceiver configured to send and receive wireless signals in communication with a base station, and one or more processors. The one or more processors are configured to: transmit, via the transceiver, to the base station an indication of a preferred TCI configuration; receive, via the transceiver, a notification signal from the base station, the notification signal including an implemented TCI configuration for a Control Resource Set (CORESET); and configure the TCI according to the implemented TCI configuration.

In an embodiment, the implemented TCI configuration comprises an interval.

In an embodiment, the one or more processors are further configured to cause the transceiver to send the interval to the base station.

In an embodiment, the one or more processors are further configured to measure PDCCH performance.

In an embodiment, the one or more processors are further configured to: generate a feedback signal that includes a preferred beam index based on the measured PDCCH performance; and cause the transceiver the transmit the feedback signal to the base station.

In an embodiment, the one or more processors are further configured to receive a switch notification from the base station in response to the feedback signal, the switch notification identifying a new beam and a switch time for switching to the new beam.

In an embodiment, the one or more processors are further configured to reconfigure the transceiver for receiving signals on the new beam at the switch time In an embodiment, a base station is disclosed that includes a transceiver configured to send and receive wireless signals in communication with a user equipment, and one or more processors. The one or more processors are configured to: generate a first Medium Access Control (MAC) signal containing a first plurality of activated TCI states; generate a downlink control information (DCI) signal having a state field that identifies a selected one of the activated TCI states; and cause the transceiver to transmit the first MAC signal and the DCI signal to the user equipment.

In an embodiment, the first MAC signal comprises 16 activated TCI states.

In an embodiment, the one or more processors are further configured to: generate a second MAC signal containing a second plurality of activated TCI states; cause the transceiver to transmit the second MAC signal to the user equipment.

In an embodiment, the second plurality of activated TCI states include a same number of activated TCI states as the first plurality of activated TCI states.

In an embodiment, the one or more processors are further configured to generate the DCI to include a group field that identifies whether the selected one of the activated states is located in the first MAC signal or the MAC signal.

In an embodiment, the state field identifies the selected one of the activated states within the MAC signal identified by the group field.

In an embodiment, the DCI is of a sufficient size to address each of the 16 activated TCI states.

DETAILED DESCRIPTION

Figure 1:
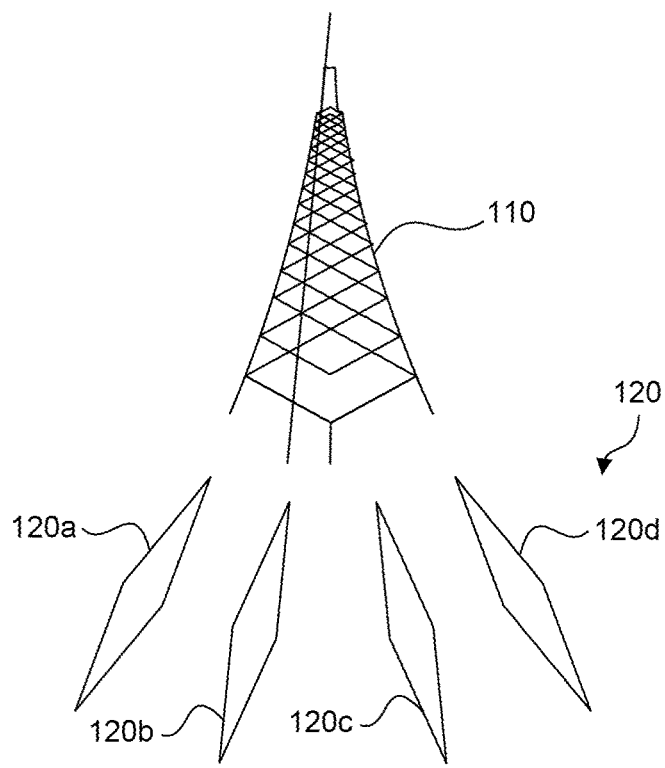
FIG. 1 illustrates an exemplary wireless communication environment according to aspects of the disclosure.
Figure 1:
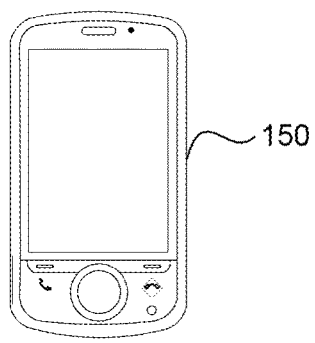

Beam sweeping is a technique in which a base station (e.g., a next generation nodeB (gNB)) transmits beams in predefined directions in a burst at a regular interval. The first step in a mobile terminal (user equipment, UE) attach procedure is Initial Access, which is to synchronize with the gNB and to receive a minimum system information broadcast. Therefore, each of the beams carries a Synchronization Signal Block (SS Block or SSB) that carries a primary synchronization signal (PSS), a secondary synchronization signal (SSS), and a Physical Broadcast Channel (PBCH) signal to allow the UE to properly synchronize with the gNB.

Upon receipt of the transmitted signals from the gNB, the UE performs a measurement operation with respect to each of the transmitted beams in order to determine a best or preferred beam from among those transmitted by the gNB. The UE then reports the selection to the gNB for future transmissions.

At higher frequencies (e.g., such as greater than 52.6 GHz), higher phase noise exists in the signals transmitted to the UE. Although this higher phase noise can be mitigated by increasing subcarrier spacing, doing so reduces symbol size. As a result, the UE will have less time to switch beams during operation.

Because of the high carrier frequency, the wavelength is much smaller than comparatively low-frequency carrier frequencies. As a result, the antennas can be spaced much closer together. Specifically, for two antennas to be independent (e.g., non-coherent), they must be spaced a minimum distance from each other equal to the wavelength divided by two (e.g., $\lambda/2$). Thus, as $\lambda$ (wavelength) decreases, so does the required spacing between antennas. Consequently, more antennas can be packed within the same space. This results in more beams being available to the UE.

As a result of an increased number of beams being available to the UE, the beam width of each beam becomes narrower, and in some instances may be much narrower than that achieved with lower frequency carriers. Beams are directed to a specific UE in a very particular manner. Thus, if the UE moves slightly or the channel changes, the UE may be outside of the useable beam width of particular beam. Consequently, the wireless system must be capable of faster beam switching/tracking than currently provided by the relevant 3GPP ($3^{rd}$ Generation Partnership Project) standards and specifications.

Beam failure detection is a process in which the UE detects and notifies the gNB of a failure to wirelessly communicate on a selected beam. Meanwhile, beam failure recovery is a process by which the gNB switches the UE from the failed beam to a new beam after the failure detection. In these processes, a Channel State Information Reference Signal (CSI-RS) is sent from the gNB to the UE. Conventionally, this CSI-RS signal is transmitted with a known period. Based on responses from the UE, the gNB determines whether there has been a beam failure, or if the quality of the beam is poor. Once a failure has been identified, the gNB notifies the UE of the failure and indicates that it will change the beam.

In embodiments of the present disclosure, in order to support beam-switching at high frequencies, an aperiodic CSI-RS (e.g., A-CSI-RS) is used to perform beam failure discovery as opposed to the conventional periodic CSI-RS. Embodiments in accordance with these configuration are disclosed below.

FIG. 1 illustrates an exemplary wireless communication environment 100 according to an aspect of the present disclosure. Example system 100 is provided for the purpose of illustration only and does not limit the disclosed aspects. System 100 may include, but is not limited to, network node (for example, a base station such as eNB, gNB, etc.) 110 and electronic device (for example, a UE) 150. Electronic device 150 (hereinafter referred to as the UE 150) may include an electronic device configured to operate based on a wide variety of wireless communication techniques. These techniques may include, but are not limited to, techniques based on 3rd Generation Partnership Project (3GPP) standards. For example, the UE 150 may include an electronic device configured to operate using Release 15 (Rel-15), Release 16 (Rel-16) or subsequent 3GPP releases. The UE 150 may include, but is not limited to, wireless communication devices, smart phones, laptops, desktops, tablets, personal assistants, monitors, televisions, wearable devices, Internet of Things (IoTs), vehicle communication devices, and the like. The network node 110 (herein referred to as base station) may include nodes configured to operate based on a wide variety of wireless communication techniques such as, but not limited to, techniques based on 3GPP standards. For example, the base station 110 may include nodes configured to operate using Rel-15, Rel-16, or subsequent 3GPP releases. In some aspects, the base station may belong to a cell. The UE 150 may connect with the cell via the base station 110. The cell may be a primary cell of the UE 150.

As shown in FIG. 1, the gNB 110 communicates with the UE 150 over a wireless communication channel. During Initial Access, the gNB 100 transmits several beams 120 to the UE. As shown in FIG. 1, each of the beams 120a, 120b, 120c, and 120d are transmitted in different directions toward the UE 150. The UE 150 receives the transmitted beams 120, performs the beam measurement, and then reports the preferred beam back to the gNB 110 for future transmission.

Figure 2:
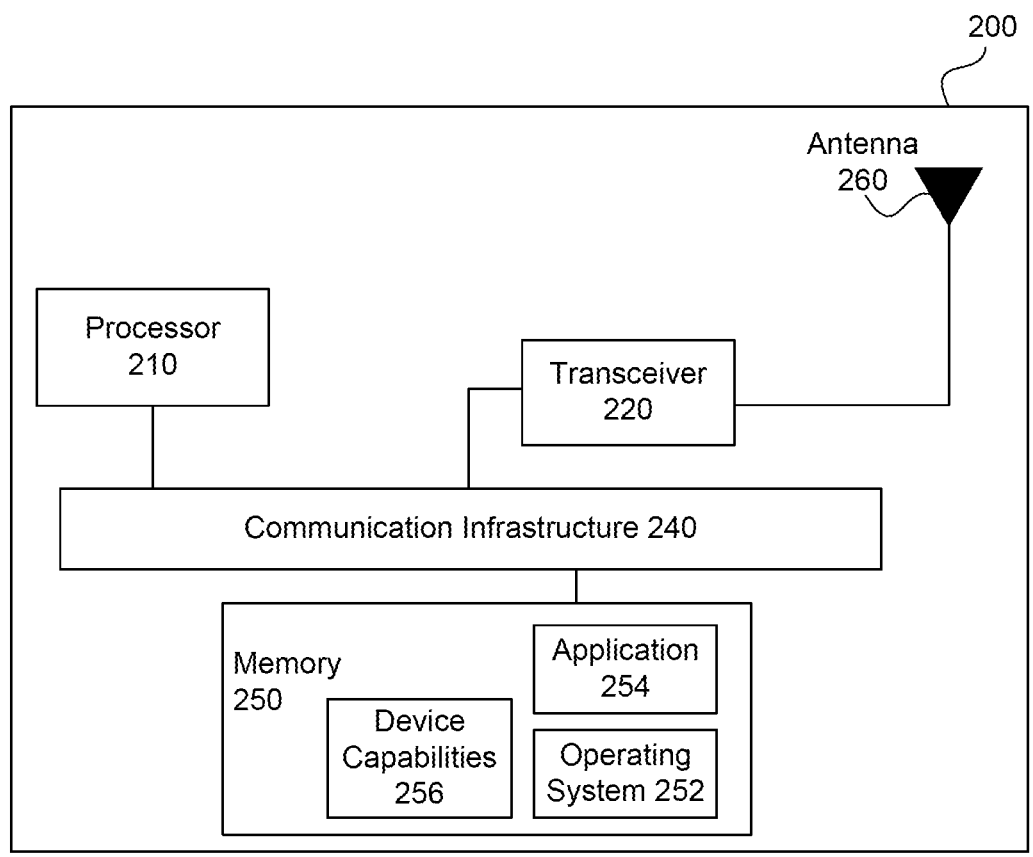
FIG. 2 illustrates a block diagram of an exemplary system of an electronic device, according to aspects of the disclosure.

FIG. 2 illustrates a block diagram of an example system 200 of an electronic device implementing various aspects of fast beam tracking according to some aspects of the disclosure. System 200 may be any of the electronic devices (e.g., the base station 110, the UE 150) of system 200. The system 200 includes a processor 210, one or more transceivers 220, communication infrastructure 240, memory 250, operating system 252, application 254, and one or more antenna 260. Illustrated systems are provided as exemplary parts of system 200, and system 200 can include other circuit(s) and subsystem(s). Also, although the systems of system 200 are illustrated as separate components, the aspects of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or one or more transceivers 220. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, Siri™, FaceTime™, radio streaming, video streaming, remote control, and/or other user applications.

System 200 can also include communication infrastructure 240. Communication infrastructure 240 provides communication between, for example, processor 210, one or more transceivers 220, and memory 250. In some implementations, communication infrastructure 240 may be a bus. Processor 210 together with instructions stored in memory 250 performs operations enabling system 200 to implement high frequency beam switching, as described herein for the system 100, as discussed above.

One or more transceivers 220 transmit and receive beam switching messages. According to some aspects, one or more transceivers 220 may be coupled to antenna 260. Antenna 260 may include one or more antennas that may be the same or different types. One or more transceivers 220 allow system 200 to communicate with other devices that may be wired and/or wireless. In some examples, one or more transceivers 220 can include processors, controllers, radios, sockets, plugs, buffers, and like circuits/devices used for connecting to and communication on networks. According to some examples, one or more transceivers 220 include one or more circuits to connect to and communicate on wired and/or wireless networks.

According to some aspects of this disclosure, one or more transceivers 220 can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 220 can include more or fewer systems for communicating with other devices.

In some examples, one or more transceivers 220 can include one or more circuits (including a WLAN transceiver) to enable connection(s) and communication over WLAN networks such as, but not limited to, networks based on standards described in IEEE 802.11.

Additionally, or alternatively, one or more transceivers 220 can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, one or more transceiver 220 can include a Bluetooth™ transceiver.

Additionally, one or more transceivers 220 can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, one or more transceivers 220 can be configured to operate according to one or more of Rel-15, Rel-16, Rel-17, or later of 3GPP standard.

According to some aspects of this disclosure, processor 210, alone or in combination with computer instructions stored within memory 250, and/or one or more transceiver 220, implements the methods and mechanisms discussed in this disclosure. For example, processor 210, alone or in combination with computer instructions stored within memory 250, and/or one or more transceiver 220, implements mechanisms for high frequency beam switching. According to some aspects of this disclosure, processor 210, alone or in combination with computer instructions stored within memory 250, and/or one or more transceiver 220, can transmit a message to a base station (for example base station 110 of FIG. 1) notifying the base station of the high-frequency beam switching capabilities of the device 200.

In a first aspect of the present disclosure, a more adaptive beam selection scheme is discussed. Specifically, there are more beams and those beams are narrower in a high-frequency system, as discussed above. Thus, there is a need to adapt the relevant Transmission Configuration Indicator (TCI) state for aperiodic CSI-RS based beam failure recovery (BFR). As is known, TCI states are sent via a Downlink Control Information (DCI) message.

In Release 15, 64 TCI states are configured by RRC signaling for the Physical Downlink Control Channel (PDCCH). In an embodiment, a Medium Access Control (MAC) Control Element (CE) activates one TCI state for a specific Control Resource Set (CORESET). The UE then decodes the PDCCH using the quasi-colocation (QCL) provided by the activated TCI state. Information regarding which beam is to be used by the UE is included in the activated TCI state.

In this embodiment, in contrast to the conventional configuration, the MAC-CE activates more than one TCI state for a specific CORESET to be used for decoding the PDCCH. Through proper configuration, the UE uses the multiple activated TCI states for decoding the PDCCH. In a first embodiment, the UE configures multiple beams corresponding to the multiple TCI states and combines them. Alternatively, in a second embodiment, the UE configures the multiple beams corresponding to the multiple TCI states and dynamically selects one or more of those beams. For example, in a scenario where the MAC-CE activates two TCI states, the UE configures the two beams, and selects the first beam, or the second beam, or both the first and the second beams. In embodiments, the UE's decision regarding which of the beams to select is based on channel conditions.

In another embodiment, a feedback mechanism is employed to allow for closer coordination of beam states between the UE and the gNB. In this embodiment, the UE feeds back information to the gNB regarding its preferred TCI state. In one such configuration, the gNB switches the TCI state based on a predefined time interval. In an embodiment, the time interval is configured by, and is known by, the UE and is provided to the gNB from the UE. This results in a beam hopping (or beam cycling) configuration, as shown for example in FIG. 3.

Figure 3:
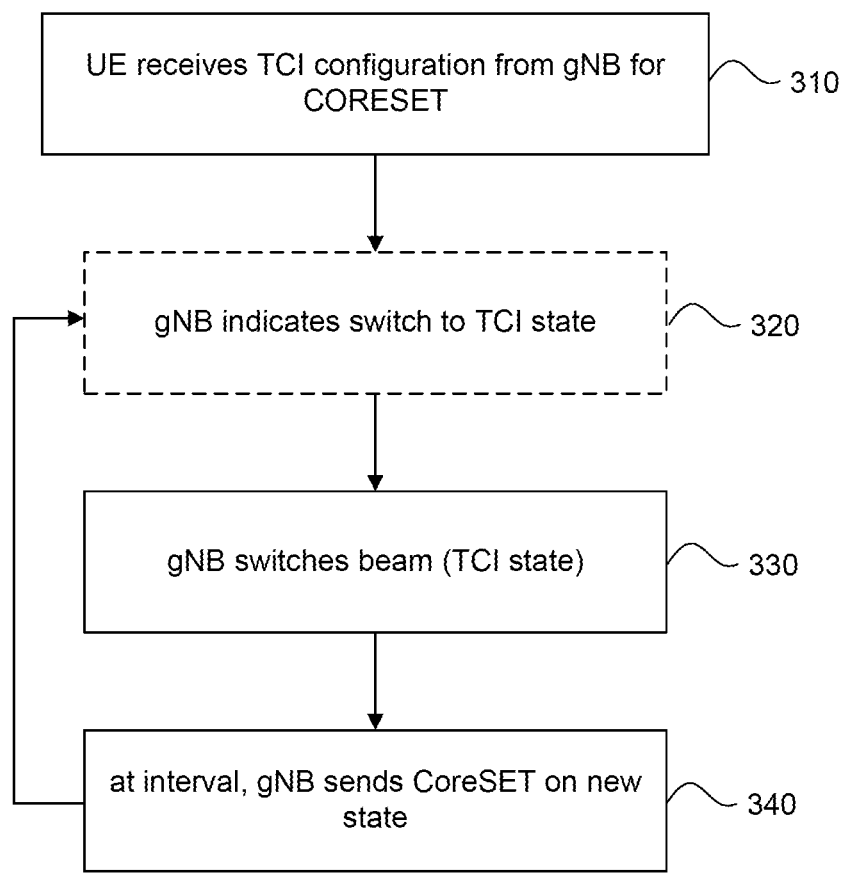
FIG. 3 illustrates a flowchart diagram of an exemplary method for beam selection according to aspects of the disclosure.

FIG. 3 illustrates a flowchart diagram of an exemplary method 300 for beam selection according to aspects of the disclosure. As shown in FIG. 3, the method begins with the UE receiving a TCI configuration from the gNB for CORESET (310) on a current or default TCI state. Thereafter, the gNB and the UE coordinate a switch to designated TCI states at predetermined intervals. Next, the gNB indicates a switch to a first TCI state (320). As part of this indication, the gNB may identify, for example, a timing with which to carry out the switch, as well as an interval with which the UE can expect to remain on the first TCI state before switching to a second TCI state. Subsequently, the gNB switches the beam to the first TCI state (330). Finally, at the predefined interval, the gNB sends CORESET on the first TCI state (340). Steps 320-340 then repeat for a second TCI state. In other words, the gNB indicates a switch to the second TCI state, then carries out that switch, and then sends CORESET using the second state in the same fashion as described above with respect to the first TCI state. As a result of this, a beam-hopping configuration is configured between the gNB and the UE. In an exemplary configuration, the gNB begins with CORESET on the first beam, then the first beam again, then switches to the second beam, the second beam, the first beam, the first beam, and so on.

In another embodiment, the gNB switches to a desired TCI stated based on feedback from the UE. In this embodiment, the UE assumes a first TCI state for decoding of the channel, and then feeds back information to the gNB regarding its preferred TCI state based on the channel analysis. In this embodiment, the gNB temporarily switches states at defined intervals within the search space. The UE is aware of this switching cycle, either from preprogramming or based on a notification from the gNB, and analyzes each of the different TCI states. Based on these analyses, the UE feeds back information to the gNB on its preferred TCI state. In an embodiment, this TCI state is the one that provides a highest signal quality from among the TCI states tested. The gNB receives this feedback information and then begins transmitting with the preferred TCI state. In an embodiment, in order to initiate this transmission on the new TCI state, the gNB sends an indication to the UE via DCI to dynamically switch to a different TCI state if the preferred state is no longer available or has deteriorated in some fashion. An example of this embodiment is illustrated in FIG. 4.

Figure 4:
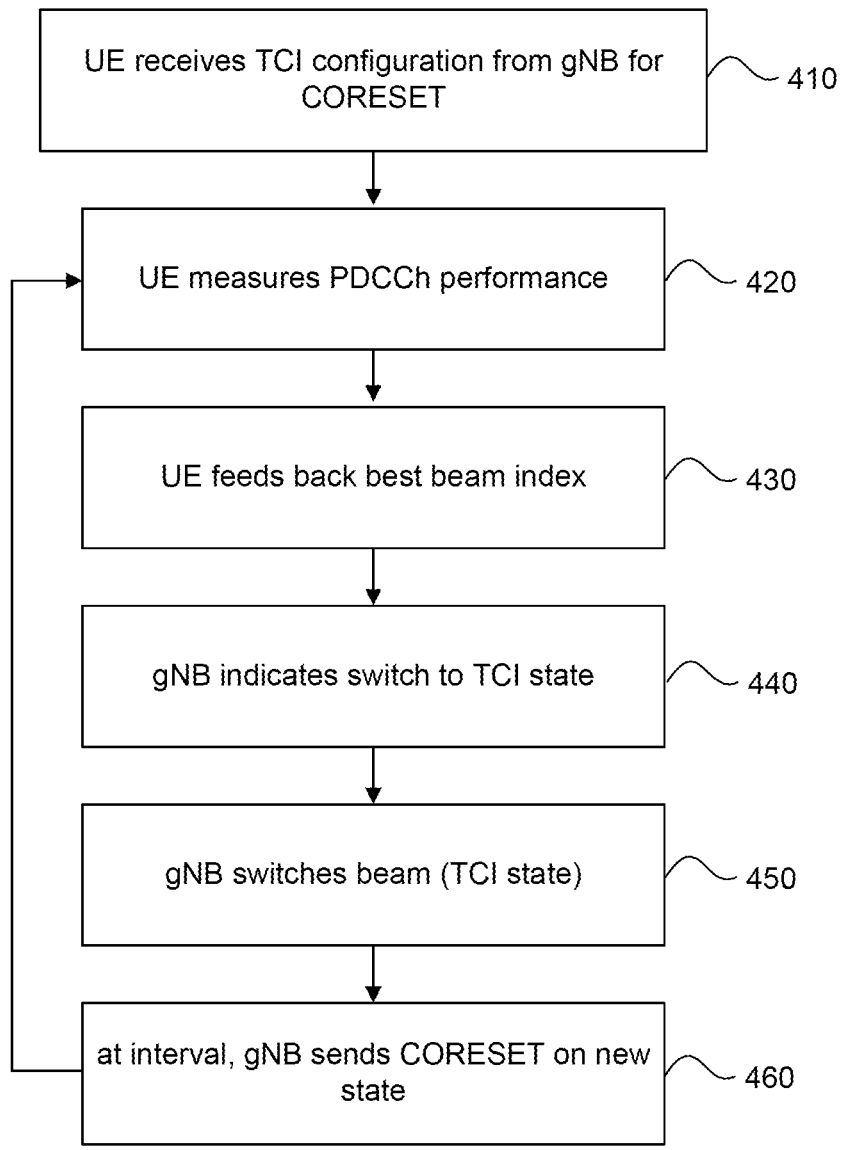
FIG. 4 illustrates a flowchart diagram of an exemplary method for beam selection according to aspects of the disclosure.

FIG. 4 illustrates a flowchart diagram of an exemplary method 400 for beam selection according to aspects of the disclosure. As shown in FIG. 4, the method 400 begins with the UE receiving a TCI configuration from the gNB for CORESET (410). The TCI state indicates what the switching periods will be for the UE to switch between different beams, as well as what the testing periods are. Within the relevant testing periods, the UE measures the PDCCH performance (420). In an embodiment, the measuring of the PDCCH performance includes measuring actual performance as well as a hypothetical Block Error Ratio (BLER). The UE then feeds back a preferred beam index to the gNB (430) based on the measurements. In response, the gNB carries out a beam switching procedure. Namely, the gNB indicates to switch to the TCI state associated with the preferred beam index at a certain time (440), and then switches to that TCI state at the designated time (450). Then, at a predetermined interval, the gNB sends information on a different state so that the UE can run further tests.

To summarize the process of FIG. 4, the gNB sends transmission on a first beam, and then on a second beam. The UE measures both of these beams, and then feeds back which beam is preferred (e.g., second beam). Based on this feedback, the gNB and the UE communicate over the second beam for some predetermined interval. In an embodiment, the UE defines its preferred TCI state, start time, and duration in its feedback. Alternatively, the UE only feeds back its preferred TCI state, and the gNB notifies the UE of the start time and duration in its indication message. In the manner described above, the UE and the gNB can coordinate beam selection in a high-frequency system.

In another embodiment, beam switching behavior is defined for aperiodic CSI-RS (A-CSI-RS). In Release 15, the UE indicates a beam switch timing from the set of (14, 28, 48). This indication defines a minimum amount of OFDM symbols between when the downlink control information (DCI) triggers CSI-RS and the transmission of the CSI-RS. However, if the CSI-RS arrives earlier than the UE's indicated beam switch timing, then certain conditions must be analyzed so that an appropriate configuration can be applied to account for this disparity. Currently, three conditions are analyzed: C1, C2 and C3. The first condition (C1) examines another signal. Specifically, the first condition tests whether there is another downlink signal with the indicated TCI state in the same symbols as the CSI-RS. The second condition (C2) examines whether at least one CORESET is configured for the bandwidth part (BWP) in which the CSI-RS is received. The third condition (C3) sets enableDefaultBeamForCCS, which sets a default beam. In this last condition, a QCL assumption is applied corresponding to a lowest-ID activated TCI state applicable to the PDSCH. Notably, this conventional method assumes that one of these conditions will always be satisfied.

But this is not necessarily true when using an aperiodic CSI-RS. Therefore, in this embodiment, new conditions (C1*, C2*, and C3*) are proposed to account for this potential failure. Specifically, when a scenario occurs in which the gNB uses A-CSI-RS for Beam Failure Discovery (BFD), the UE first examines whether another downlink signal with the indicated TCI state exists in the same symbols as the A-CSI-RS. If so, then the UE applies the QCL assumption of the other downlink signal when receiving the A-CSI-RS.

In this embodiment, because A-CSI-RS is being used for beam failure discovery, the UE essentially examines additional hypothetical beams that may or may not be applicable to the UE at a present time. Therefore, the second and third conditions need to be applicable to those hypothetical beams.

As such, if no other downlink signal exists that meets the above criteria (e.g., C1* fails), then the second condition (C2*) is tested. For this condition, a determination is made regarding whether at least one CORESET is configured for the bandwidth part in which the A-CSI-RS is received. If so, then a CORESET associated with a lowest controlResourceSetId is applied or a specific CORESET/TCI state is alternatively applied. In embodiments, the DCI includes an indicator (e.g., controlResourceSetId) of the CORESET to be used. The DCI may also include the TCI state to be used.

If the second condition is also not satisfied (e.g., C2* fails), then the third condition (C3*) is applied. In this condition, a default beam may be applied. However, because there are more beams in the high-frequency scenario, instead of having one default beam index, multiple default beam indexes are defined, and the DCI indicates which to use for the preferred beam of the UE. Therefore, in this embodiment, unlike the current approach, the bandwidth part includes multiple defaultBeams and the DCI indicates a defaultBeam index to be used by the UE for its preferred beam. This is illustrated, for example, in FIG. 5.

Figure 5:
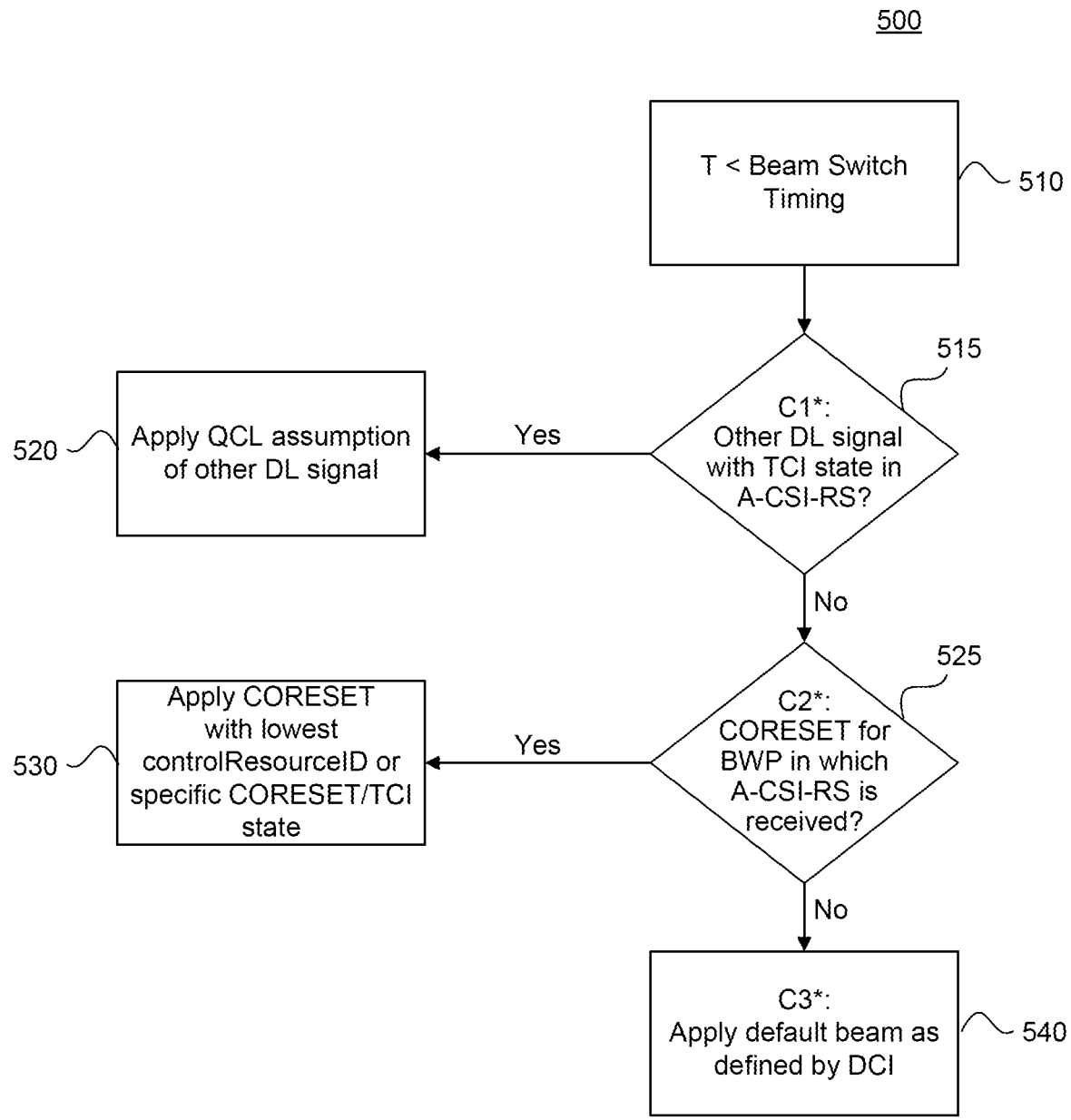
FIG. 5 illustrates a flowchart diagram of an exemplary method for performing beam failure recovery according to aspects of the disclosure.

FIG. 5 illustrates a flowchart diagram of an exemplary method 500 for performing beam failure discovery according to aspects of the disclosure. As shown in FIG. 5, the method begins with a determination that the arrival time of the A-CSI-RS is less than the BeamSwitchTiming required by the UE (510). Following this determination, the first condition (C1*) is analyzed (515). Specifically, a determination is made regarding whether there exists another downlink signal with the indicated TCI state in the same symbols as the A-CSI-RS. If so (515-Y), then the UE applies the QCL assumption of the other downlink signal (520).

If no such signal exists (515-N), then the second condition (C2*) is analyzed (525). Specifically, a determination is made regarding whether at least one CORESET is configured for the bandwidth part in which the A-CSI-RS is received (525). If such a CORESET exists (525-Y), then the UE applies the CORESET with the lowest controlResourceId or a specific CORESET/TCI state defined by the downlink control information (DCI) (530). Alternatively, if no such CORESET exists (525-N), then the UE applies a default beam as defined by DCI (540). In this manner, the UE and gNB are capable of performing Beam Failure Discovery when using an aperiodic CSI-RS.

In another embodiment, improved TCI state adaptation for use with decoding the PDSCH is proposed. In release 15, 128 states are configured by RRC signaling for decoding of the PDSCH. T MAC-CE activates up to 8 TCI states and the DCI indicates the TCI state to apply to the PDSCH resource allocation. This is shown, for example in FIG. 6.

Figure 6:
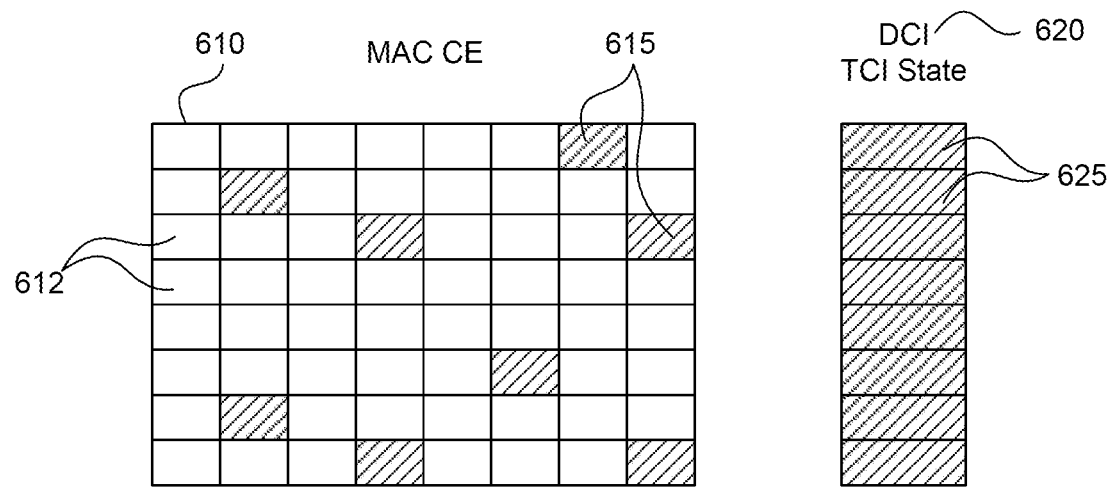
FIG. 6 illustrates a block diagram of exemplary signal fields for activating TCI states according to aspects of the disclosure.

FIG. 6 illustrates a block diagram of exemplary signal fields for activating TCI states according to aspects of the disclosure. As shown in FIG. 6, the UE receives a MAC-CE 610 that includes 64 configured TCI states 612. Within those 64 configured states, the MAC-CE 610 identifies 8 that are activated 615. Meanwhile, the DCI 620 identifies the TCI state to be used from among those activated by the MAC-CE. Based on this information, the UE decodes the PDSCH using the QCL provided by the identified TCI state.

In another embodiment, in order to support high-frequency beam switching, the number of TCI states configured by RRC signaling is increased to 128 or 256. In this embodiment, the number of activated TCI states per Physical Downlink Shared Channel (PDSCH) is also increased to allow for an increase in the number of addressable beams. However, there is limited space in the MAC-CE to allow for this many TCI states. Therefore, in a first configuration, the MAC-CE is configured to activate more TCI states, and the DCI is increased in size to properly identify the TCI state to be used from among those activated. Meanwhile, in an alternative configuration, two MAC-CEs are used, each corresponding to a different group of activated TCIs. Then, the DCI includes a first field that identifies the group in which the selected TCI is located, and then a second field that identifies the selected TCI within that group. By configuring the MAC-CE and the DCI in this manner, the UE is capable of quickly adapting to new TCI states despite narrower beams or an increased number of beams, without the need for CSI-RS based beam failure recovery. These different configurations are illustrated, for example, in FIGS. 7A and 7B.

Figure 7A:
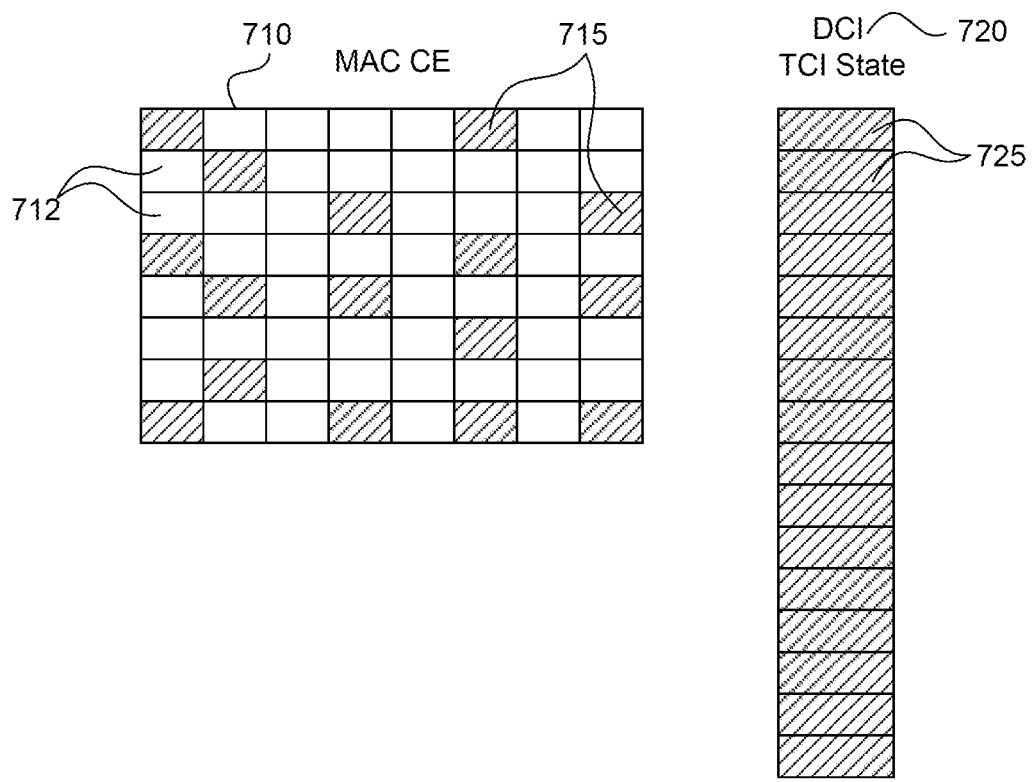
FIG. 7A illustrates a block diagram of exemplary signal fields for activating TCI states according to aspects of the disclosure.

For example, FIG. 7A illustrates a block diagram of exemplary signal fields for activating TCI states according to aspects of the disclosure. As shown in FIG. 7A, a MAC-CE 710 includes 64 TCI states 712. Of those, as opposed to the 8 TCI states conventionally activated, the MAC-CE activates up to 16 TCI states 715. In the first configuration shown in FIG. 7A, the DCI 720 is increased in size from the DCI 620 of FIG. 6. This enlarged field 725 of the DCI 720 is then capable of properly identifying each of the activated TCI states 715. In this manner, the UE can determine the selected TCI state 712 from the enlarged DCI 720.

Figure 7B:
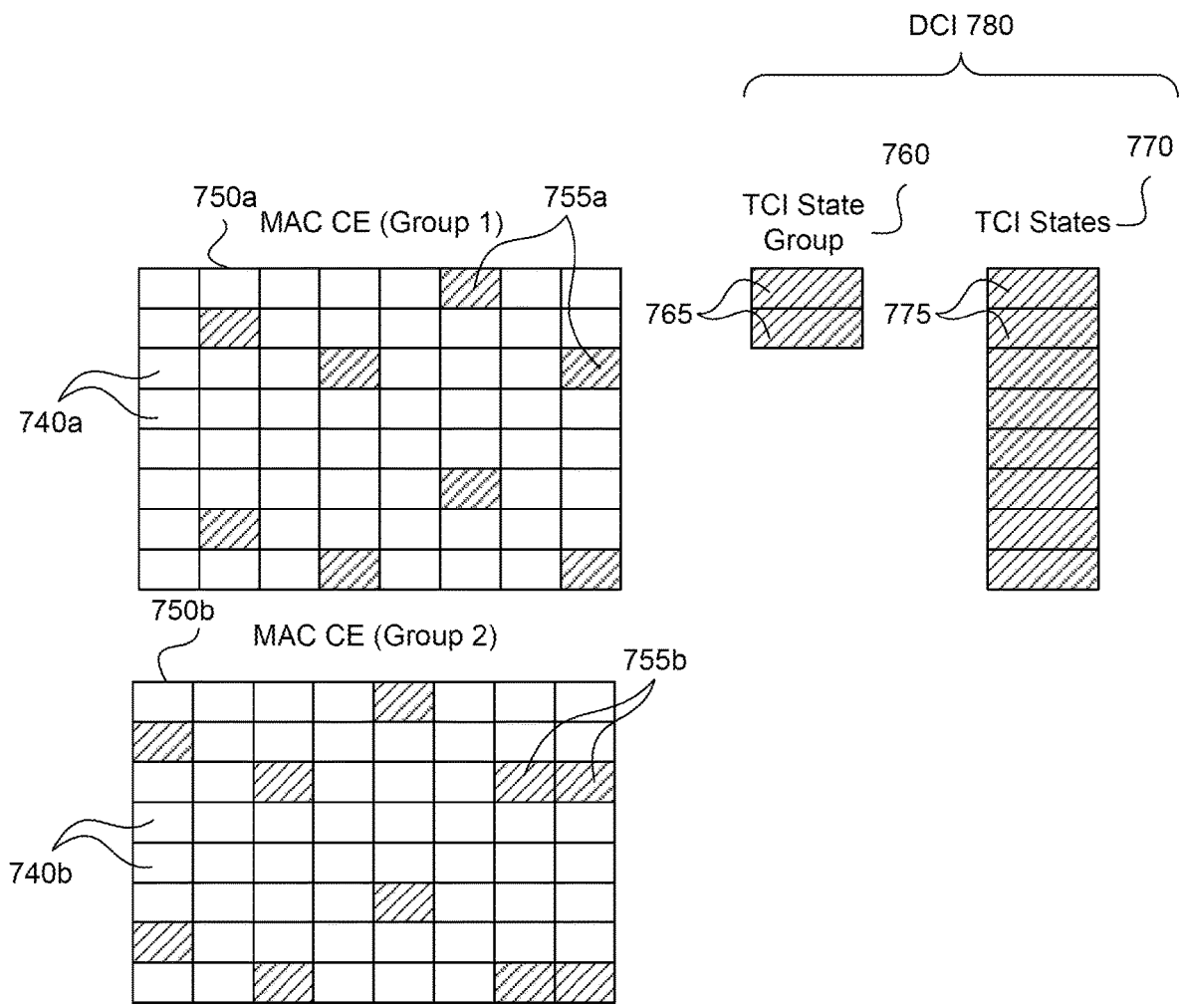
FIG. 7B illustrates a block diagram of exemplary signal fields for activating TCI states according to aspects of the disclosure.

An alternative configuration for providing an increased number of TCI states to the UE is disclosed in FIG. 7B. FIG. 7B illustrates a block diagram of exemplary signal fields for activating TCI states according to aspects of the disclosure. As shown in FIG. 7B, in order to reduce the size of the DCI, two MAC-CEs are sent to the UE, each corresponding to a different group of TCIs. For example, a first MAC-CE 750*a* corresponds to a first group of TCIs 740*a*. Within the first MAC-CE 750*a*, up to 8 TCIs (755*a*) are activated. Similarly, a second MAC-CE 750*b* corresponds to a second group of TCIs 740*b*. Within the second MAC-CE 750*b*, up to 8 TCIs (755*b*) are activated.

With this multi-group configuration, the DCI 780 is configured with two fields. A group field 760 includes a number of bits or other identifiers 765 that identify whether the selected TCI state resides in the first group (first MAC-CE 750*a*) or the second group (second MAC-CE 750*b*). A TCI state field 770 likewise includes a number of bits or other identifiers 775 that indicate which of the activated TCI states within the identified group is selected. In this manner, the DCI 780 can be configured to identify an increased number of TCI states with a minimal increase in size from a conventional DCI.

Figure 8:
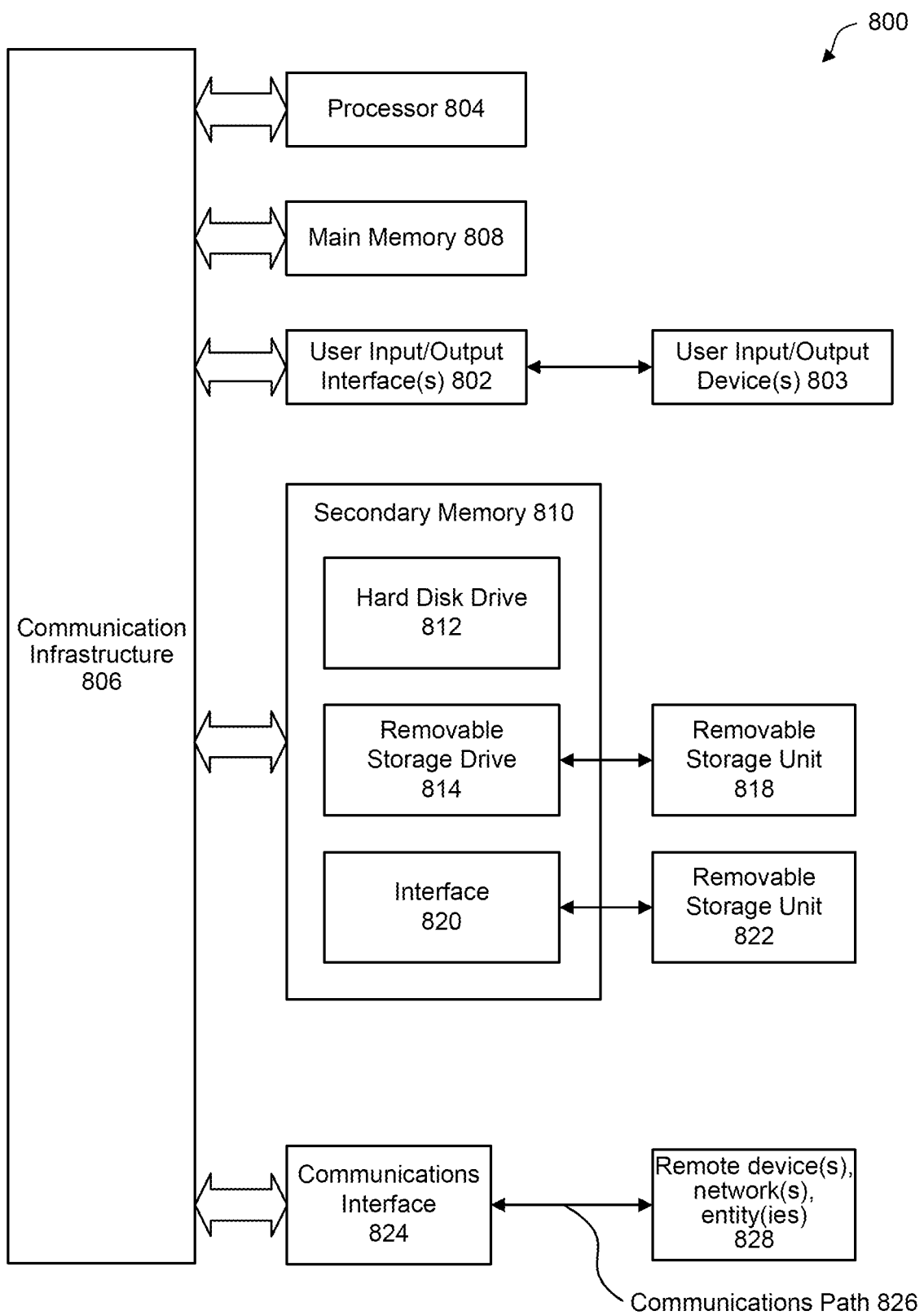
FIG. 8 illustrates a block representation of an exemplary generic computer system capable of implementing certain aspects of the present disclosure.

Various aspects can be implemented, for example, using one or more computer systems, such as computer system 800 shown in FIG. 8. Computer system 800 can be any well-known computer capable of performing the functions described herein such as devices 810, 820 of FIG. 8, or 200 of FIG. 2. Computer system 800 includes one or more processors (also called central processing units, or CPUs), such as a processor 804. Processor 804 is connected to a communication infrastructure 806 (e.g., a bus.) Computer system 800 also includes user input/output device(s) 803, such as monitors, keyboards, pointing devices, etc., that communicate with communication infrastructure 806 through user input/output interface(s) 802. Computer system 800 also includes a main or primary memory 808, such as random access memory (RAM). Main memory 808 may include one or more levels of cache. Main memory 808 has stored therein control logic (e.g., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to some aspects, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 800, main memory 808, secondary memory 810 and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 8. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary aspects of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific aspects will so fully reveal the general nature of the disclosure that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary aspects, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes.

Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A user equipment (UE), comprising:
a transceiver configured to transmit and receive wireless signals in communication with a base station; and
one or more processors configured to:
receive, from the base station, a configuration signal that includes a plurality of activated transmission configuration indicator (TCI) states for a Control Resource Set (CORESET);
decode, using a quasi-colocation provided by each of the plurality of activated TCI states, a physical downlink control channel (PDCCH);
configure a plurality of beams based on the decoded PDCCH, each of the plurality of beams corresponding to each of the plurality of activated TCI states; and
combine the plurality of beams into an aggregate beam.

2. The UE of claim 1, wherein the one or more processors are further configured to:
measure conditions of the PDCCH; and
dynamically select one of the plurality of beams based on the measured PDCCH conditions.

3. The UE of claim 1, wherein the one or more processors are further configured to:
generate a capability message signal, the capability message signal indicating that the UE is capable of processing more than one TCI state for a particular CORESET; and
cause the transceiver the transmit the capability message signal to the base station.

4. The UE of claim 1, wherein the configuration signal indicates a number of TCI states included in the plurality of activated TCI states.

5. The UE of claim 1, wherein the configuration signal includes an interval that dictates when the base station will communicate using a first TCI state from among the plurality of activated TCI states, and when the base station will communicate using a second TCI state from among the plurality of activated TCI states, and
wherein the one or more processors are further configured to switch between the first TCI state and the second TCI state according to the interval.

6. A user equipment (UE), comprising:
a transceiver configured to send and receive wireless signals in communication with a base station; and
one or more processors configured to:
configure a default transmission configuration indicator (TCI) configuration;
transmit, via the transceiver, to the base station an indication of a preferred TCI configuration that is different from the default TCI configuration;
receive, via the transceiver, a notification signal from the base station, the notification signal including an implemented TCI configuration for a Control Resource Set (CORESET); and
configure a TCI according to the implemented TCI configuration.

7. The UE of claim 6, wherein the implemented TCI configuration comprises an interval.

8. The UE of claim 7, wherein the one or more processors are further configured to cause the transceiver to send the interval to the base station.

9. The UE of claim 6, wherein the one or more processors are further configured to measure a physical downlink control channel (PDCCH) performance.

10. The UE of claim 9, wherein the one or more processors are further configured to:
generate a feedback signal that includes a preferred beam index based on the measured PDCCH performance; and
cause the transceiver the transmit the feedback signal to the base station.

11. The UE of claim 10, wherein the one or more processors are further configured to receive a switch notification from the base station in response to the feedback signal, the switch notification identifying a new beam and a switch time for switching to the new beam.

12. The UE of claim 11, wherein the one or more processors are further configured to reconfigure the transceiver for receiving signals on the new beam at the switch time.

13. The UE of claim 6, wherein the TCI includes a plurality of beams combined into an aggregate beam.

* * * * *